United States Patent [19]

Tribellini

[11] 3,905,901
[45] Sept. 16, 1975

[54] PROCESS FOR REMOVING HYDROCARBONS AND OTHER ORGANIC PRODUCTS FROM AQUEOUS FLUIDS

[75] Inventor: Aldo Tribellini, St-Chamond, France

[73] Assignee: Creusot-Loire, Paris, France

[22] Filed: Mar. 25, 1974

[21] Appl. No.: 454,771

[30] Foreign Application Priority Data
Mar. 28, 1973  France .......................... 73.11063

[52] U.S. Cl. ................. 210/21; 210/40; 210/DIG. 5
[51] Int. Cl.² .......................................... B01D 11/04
[58] Field of Search ........ 252/182, 323; 210/21, 24, 210/502, 503, 504, DIG. 5

[56] References Cited
UNITED STATES PATENTS

| | | |
|---|---|---|
| 3,487,928 | 1/1970 | Canevari ............................ 252/323 |
| 3,676,357 | 7/1972 | Ciuti et al. .......................... 252/323 |

FOREIGN PATENTS OR APPLICATIONS

| | | |
|---|---|---|
| 1,139,499 | 1962 | Germany ........................... 252/184 |
| 714,904 | 1954 | United Kingdom .................. 210/21 |

*Primary Examiner*—John Adee
*Assistant Examiner*—Ethel R. Cross
*Attorney, Agent, or Firm*—Young & Thompson

[57] ABSTRACT

For purifying aqueous industrial effluents containing hydrocarbons as pollutants by means of a solid complex.

The effluent to be treated is intimately mixed with a hydrocarbonated solvent insoluble in water and the mixture obtained is passed through a bed of the solid complex which separates the hydrocarbonated solvent, containing the hydrocarbons and other organic products in the dissolved state, from the purified effluent.

10 Claims, 1 Drawing Figure

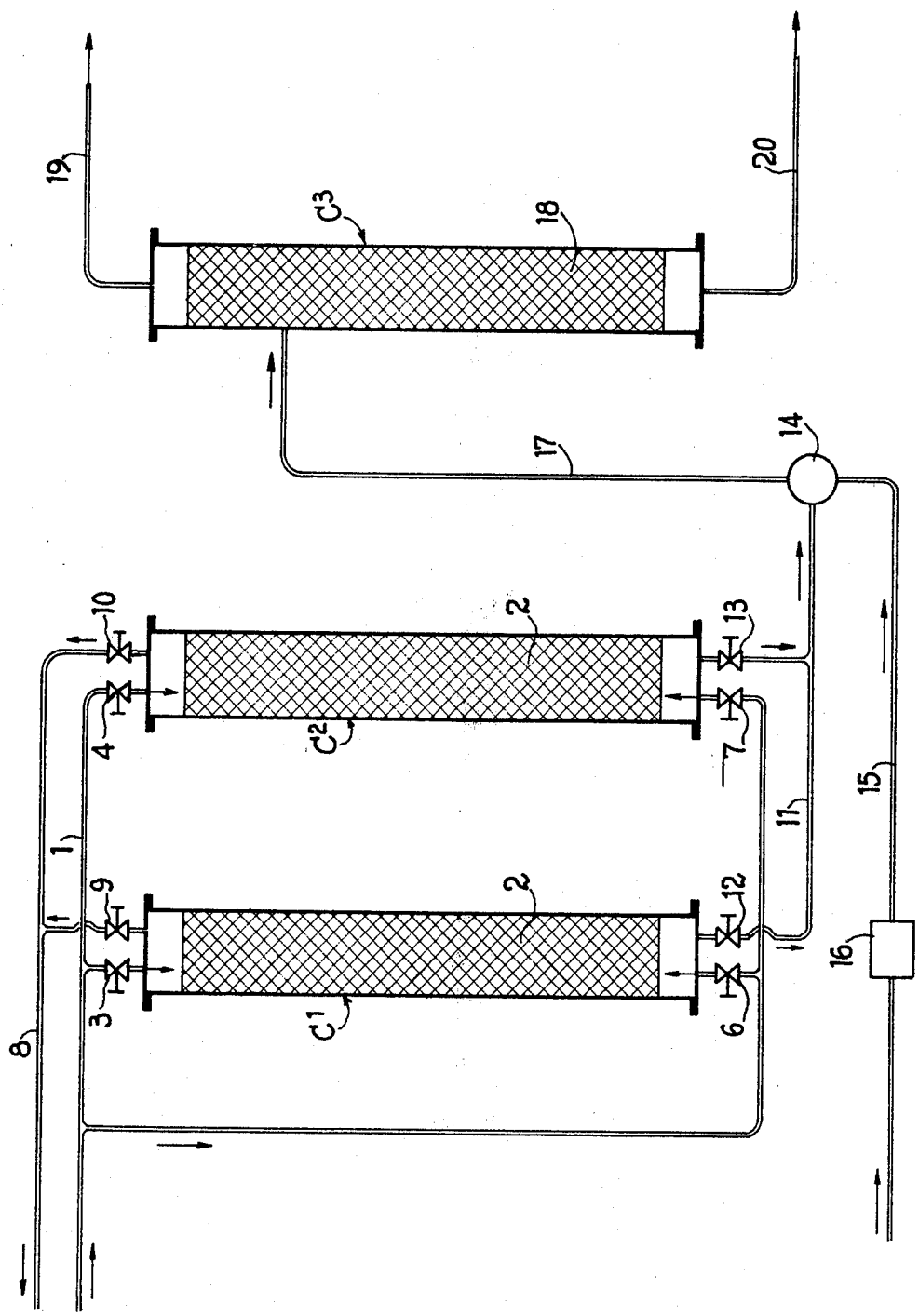

PROCESS FOR REMOVING HYDROCARBONS AND OTHER ORGANIC PRODUCTS FROM AQUEOUS FLUIDS

The present invention relates to the binding of hydrocarbons and other organic materials contained in fluids, and in particular in waste waters or industrial effluents of various origins.

According to the invention, the process for binding hydrocarbons and other organic materials contained in waste waters or aqueous effluents of various origins comprises intimately mixing with the effluent a hydrocarbon solvent insoluble in water, and passing the mixture obtained through a bed of a solid complex consisting essentially of a solid substrate bearing free hydroxyl groups activated with 0.01 to 10 parts by weight of an acid halide per one part of said substrate, and to which is covalently bound from 0.01 to 10 parts by weight of an amine selected from the primary aliphatic amines having from 6 to 20 carbon atoms and the primary aromatic amines having, attached to a phenyl ring, a linear hydrocarbon chain of 1 to 10 carbon atoms bearing the amine group so as to separate the hydrocarbon solvent, containing the hydrocarbons and other organic materials in the dissolved state, from the purified effluent.

According to another feature of the invention, the effluent to be treated is first contacted with the solid complex and the pre-purified effluent thus obtained is thereafter mixed with said hydrocarbon solvent.

Further features of the invention will be apparent from the ensuing description.

The solid complex employed in the process according to the invention and its process of preparation have been described in detail in the co-pending application Ser. No. 416,575 whose description is here incorporated as a reference.

The fluids to which the present invention more particularly applies are waste waters containing hydrocarbons as major pollutant and possibly also containing organic materials such as sulphur derivatives. These effluents may come from various sources, such as petroleum refineries, power stations operating with fuel oil, port installations or plants on oil tankers (deballasting effluents), paper works, mechanical manufacturing factories (effluents composed of mixtures of water and cutting oils) etc.

Depending on their origin, these effluents may contain variable proportions of hydrocarbons and other pollutants. In most cases, they are first made to undergo a decantation, for example in tanks of API type (American Petroleum Institute) or other tanks so as to eliminate a large part of the materials in suspension. For a good operation of the process according to the invention, it is advantageous to arrange that the content of materials in suspension in the effluent to be treated be less than 1500 ppm (parts per million) and preferably less than 100 ppm. Further, it is preferable to arrange that the hydrocarbon content not be excessively high and lower than or equal to 1000 ppm and advantageously lower than about 100 ppm. As concerns the sulphur derivatives, their content is preferably lower than about 500 ppm.

It is known that in order to satisfy present-day regulations, the effluent must have, when it is rejected into the natural medium, a hydrocarbon content of no more than 5 ppm.

According to the present invention, in order to achieve this result, there is preferably first carried out a pre-purifying by contacting the effluent (advantageously decanted) with the aforementioned solid complex arranged in the form of a bed which the effluent passes through and where its hydrocarbon content is substantially reduced, for example, to about 20 ppm. For this purpose, any complex described in the aforementioned patent application may be employed but there is preferred a complex of a mineral substrate (porcelaine biscuit, crushed brick, sand, etc.) with a primary aliphatic amine of $C_{12}$ to $C_{18}$ such as n-tetradecylamine, dodecylamine and n-octadecylamine, or a primary aromatic amine such as phenylbutylamine. The particle size of the complex employed in this pre-purification is advantageously between about 1 and 3 mm on average. The duration of contact is calculated to result in the desired hydrocarbon content at this stage, for example about 20 ppm, as mentioned hereinbefore.

In the case of the treatment of effluents containing cutting oils (soluble oils) a pre-purification of the effluent is advantageously carried out with a primary amine-bentonite complex, such as that described in the aforementioned patent application by mixing the effluent with for example 0.5 to 1% by weight of the complex. The complex separates out by the effect of gravity and carries the oil along therewith. This pretreatment lowers the oil content of the effluent from about 1% to about 150 ppm which is acceptable for the subsequent stages of the process.

This pre-purifying stage is preferred but in some cases in which the hrdrocarbon content of the effluent is not very high it may be dispensed with.

The effluent is then intimately mixed with a hydrocarbon solvent insoluble in water, in particular a paraffinic hydrocarbon cut from oil distillation within the range of $C_6$ to $C_{20}$ and preferably $C_{12}$ to $C_{18}$. The amount of solvent added depends of course on the content of hydrocarbons and other organic materials in the effluent, but a proportion of 500 to 2000 ppm gives excellent results in most cases. The function of the solvent is to extract the hydrocarbons and other organic materials remaining in the effluent.

The mixture thus obtained is conveyed to a bed of an organic complex according to the aforementioned patent application. The complex employed here is advantageously such as that described in respect of the pre-purification, but it may be another complex if desired. The particle size is preferably 0.5 to 1.5 mm on average and in particular 0.6 to 1.2 mm. The effluent-solvent mixture is conveyed to the bed at a certain distance from the upper part of the latter so that, under the action of the complex, the solvent and the dissolved materials (hydrocarbons, organic materials) leave the bed through the upper part of the latter and the purified effluent, whose hydrocarbon content is of the order of 5 ppm, leaves the lower part of the bed. Bed heights of 50 to 70 cm have been found satisfactory in most cases but higher beds or lower beds may be employed if desired.

The flow of the effluent through the bed may vary within wide ranges, a flow of 1 to 5 litres/hour/sq.cm of passage section giving good results.

The aforementioned process permits the treatment of the effluents whose temperature varies from room temperature to a temperature in the neighbourhood of the boiling point of the effluent. The process according to the invention generates substantially no heat itself.

The process will now be described with reference to the accompanying drawing in which the single FIGURE diagrammatically represents a plant for carrying out the process.

The effluent to be treated, for example coming from a decantation tank, is supplied by a pipe 1 to the top of two pre-purifying columns $C^1$ and $C^2$ which are provided with a bed 2 of a granular solid complex and operate in an alternating manner. The supply of the effluent to the columns is regulated by valves 3 and 4 respectively. Periodically, each column is alternately cleared by sending liquid to the lower part of the latter by way of a conduit 5 provided with valves 6 and 7. When one column is being cleared it is the other column which purifies and vice versa. In order to clear the column either the effluent to be purified itself may be employed or any water from which materials in suspension have been removed. The water which has been used for clearing the column leaves the column by way of a pipe 8 in which are included valves 9 and 10.

The pre-purified effluent leaves the columns $C^1$ and $C^2$ by way of a pipe 11, the flow being controlled by valves 12 and 13. It arrives in a mixer-homogeneizer unit 14 in which it is intimately mixed with hydrocarbon solvent which is unmiscible with water arriving by way of a pipe 15 having a metering pump 16.

The effluent-solvent mixture is sent by way of a pipe 17 to a finishing column $C^3$ filled with a bed 18 of solid granular complex. The pipe 17 opens out at a certain distance (for example 10 to 50 cm) below the surface of the bed 18. It is in this column that the separation between the solvent and the effluent occurs. The solvent leaves the column by way of a pipe 19 located at the top of the latter and the purified effluent leaves at the lower part by way of a pipe 20.

The following examples, to which the invention is not intended to be limited, illustrate the invention.

EXAMPLE 1

Treatment of an Effluent from an Oil Cracking and Reforming Unit

After a first decantation, the aqueous effluent still contains 60 to 70 ppm of total hydrocarbons and a similar proportion of materials in suspension. The effluent passes through a first column ($C^1$-$C^2$) containing 70 cm of a crushed porcelain - n-tetradecylamine complex prepared in accordance with Example 5 of the aforementioned patent application having a particle size of 1–3 mm. The flow is 1.5 litre/hour/sq.cm and every three hours the column is cleared for 10 minutes with a flow of 4.5 litres/hour/sq.cm with the same effluent which is thereafter returned to the decantation tank.

At the outlet of the first column, the effluent contains only 13 ppm of total hydrocarbons. It contains practically no more materials in suspension and no phenol.

There are then intimately mixed with the effluent issuing from the first column 2000 ppm of an aliphatic paraffinic hydrocarbon cut of $C_{12}$ to $C_{18}$.

The mixture is homogeneized by mechanical agitation so that there is obtained an emulsion which is stable for 12 hours.

The mixture obtained is then supplied to a second column $C^3$ containing a layer of 50 cm of the same complex but having a particle size of 0.6 to 1.2 mm. An effluent is obtained at the base of the column which contains only 3.2 to 3.4 of total hydrocarbons.

EXAMPLE 2

Treatment of an Effluent from a Petrochemical Refinery

With an effluent containing 80 to 100 ppm of total hydrocarbons and at least 50 mg/l of materials in suspension, treatment in the first column ($C^1$-$C^2$) under conditions identical to those of Example 1, yields a pre-purified effluent containing 20 ppm of total hydrocarbons. There are still 50 mg/l of total sulphur (of which about ⅓ is $H_2S$) and there are no longer any materials in suspension.

After adding 2000 ppm of the same paraffinic cut as in Example 1 and treatment in the second column ($C^3$), 2.5 to 4 ppm of total hydrocarbons remain in the final effluent. The total sulphur has been reduced to 15 ppm, then to 6 ppm after a second passage through the column. Note that this total sulphur also includes mineral sulphur.

Another treating test was carried out by adding only 1000 ppm of the paraffinic cut. 4 ppm of total hydrocarbons and 32 mg/l of total sulphur were then obtained at the outlet of the second column ($C^3$).

EXAMPLE 3

A mixture of water and cutting oil at a concentration of 1% must be treated before sending it to the waste water drain.

This 1% soluble oil was first mixed with 0.5 to 1% by weight of a bentonite-n-tetradecylamine complex prepared in accordance with Example 2 of the aforementioned patent application. The emulsion is broken and the oil is carried along with the bentonite to the bottom of the container. It may be separated out by decantation.

The surnatent liquid is a slightly cloudy water still containing 150 ppm of total hydrocarbons. There are added to the effluent 2000 ppm of a paraffinic hydrocarbon cut of $C_{12}$ to $C_{16}$. The mixture is supplied to the finishing column ($C^3$) containing the same bentonite-n-tetradecylamine complex and there issues an effluent which contains only 5 ppm of total hydrocarbons.

Having now described my invention what I claim as new and desire to secure by Letters Patent is:

1. A process for removing hydrocarbons contained in an aqueous fluid, such as waste water or an industrial aqueous effluent, comprising intimately mixing with the effluent a hydrocarbon solvent insoluble in water, and passing the mixture obtained through a bed of a solid complex consisting essentially of a solid substrate bearing free hydroxyl groups activated with 0.01 to 10 parts by weight of an acid halide per one part of said substrate and to which is covalently bound from 0.01 to 10 parts by weight of an amine selected from the primary aliphatic amines having from 6 to 20 carbon atoms and the primary aromatic amines having, attached to a phenyl ring, a linear hydrocarbon chain of 1 to 10 carbon atoms bearing the amine group, thereby separating the hydrocarbon solvent containing said hydrocarbons from the purified effluent.

2. A process as claimed in claim 1, comprising first contacting the effluent to be treated with the solid complex so as to obtain a pre-purified effluent, mixing the pre-purified effluent with the hydrocarbon solvent and sending the mixture obtained into the bed of solid complex.

3. A process as claimed in claim 1, wherein the hydrocarbon solvent is a paraffinic hydrocarbon cut of $C_6$ to $C_{20}$ and preferably $C_{12}$ to $C_{18}$ from oil distillation.

4. A process as claimed in claim 3, wherein the paraffinic hydrocarbon cut is of $C_{12}$ to $C_{18}$.

5. A process as claimed in claim 3, wherein about 500 to 2000 ppm of said paraffinic hydrocarbon cut is mixed with the effluent.

6. A process as claimed in claim 3, wherein the solid complex employed for the pre-purification is of the same nature as the solid complex employed for the final purification.

7. A process as claimed in claim 6, wherein the particle size of the complex employed for the pre-purification is about 1–3 mm and the particle size of the complex employed for the final purification is 0.5–1.5 mm.

8. A process as claimed in claim 1, wherein the solid complex is a complex of a mineral substrate with a primary organic amine.

9. A process as claimed in claim 1, wherein the solid complex is a complex of a mineral substrate with a primary aliphatic amine.

10. A process as claimed in claim 1, wherein the separation of the solvent and effluent is carried out by sending the solvent-effluent mixture to the bed of complex at a certain distance below the upper surface of the bed, the solvent being made to leave the bed by way of the upper part of the bed and the effluent being made to leave the bed by way of the lower part of the bed.

* * * * *